United States Patent [19]

Stewart et al.

[11] 4,231,227
[45] Nov. 4, 1980

[54] PRILL TOWER RAKE

[75] Inventors: Robert M. Stewart; Robert W. Schwartz, both of Memphis, Tenn.

[73] Assignee: W. R. Grace & Co., New York, N.Y.

[21] Appl. No.: 23,911

[22] Filed: Mar. 26, 1979

Related U.S. Application Data

[62] Division of Ser. No. 832,933, Sep. 13, 1977, Pat. No. 4,160,631.

[51] Int. Cl.³ ............................................. F25D 17/00
[52] U.S. Cl. .......................................... 62/57; 264/14
[58] Field of Search ........................ 62/57, 62; 264/14

[56] References Cited

U.S. PATENT DOCUMENTS

| 12,422 | 2/1855 | Taggart | 209/245 |
|---|---|---|---|
| 2,384,181 | 9/1945 | Fave | 209/245 |
| 2,921,335 | 1/1960 | Bowers et al. | 425/10 |
| 3,414,640 | 12/1968 | Garetto et al. | 425/10 |
| 3,450,804 | 6/1969 | Bocckino et al. | 264/14 |
| 3,534,434 | 10/1970 | Zavasnik | 425/6 |
| 3,686,373 | 8/1972 | Griesheimer et al. | 264/14 |
| 3,819,310 | 6/1974 | Mavrovic | 425/7 |
| 3,933,956 | 1/1976 | Mavrovic | 264/14 |
| 4,028,447 | 6/1977 | Talbert | 264/14 |

FOREIGN PATENT DOCUMENTS

| 141942 | 4/1920 | United Kingdom . | |
| 1093476 | 12/1967 | United Kingdom | 264/14 |

Primary Examiner—Ronald C. Capossela
Attorney, Agent, or Firm—Charles L. Harness

[57] ABSTRACT

Apparatus and method for cooling and collecting prills at the bottom of a prill tower including a fluidized prill bed and a rake rotatable therethrough.

1 Claim, 2 Drawing Figures

PRILL TOWER RAKE

This is a division of application Ser. No. 832,933 filed Sept. 13, 1977 now U.S. Pat. No. 4,160,631.

This invention relates to apparatus for the collection of prills in a prilling tower. The apparatus includes a perforated base plate (fluidizing screen) at the bottom of the tower, with means to introduce air through the bottom of the plate so as to fluidize a bed of prills on the plate. A rotating rake moves through the fluidizing bed of prills and directs same into one or more chutes (collection exits) in the perforated plate. The invention also includes the method of using the apparatus to provide cooled urea prills.

The invention is more clearly shown in the accompanying figures, FIG. 1 and FIG. 2.

Figure 1:
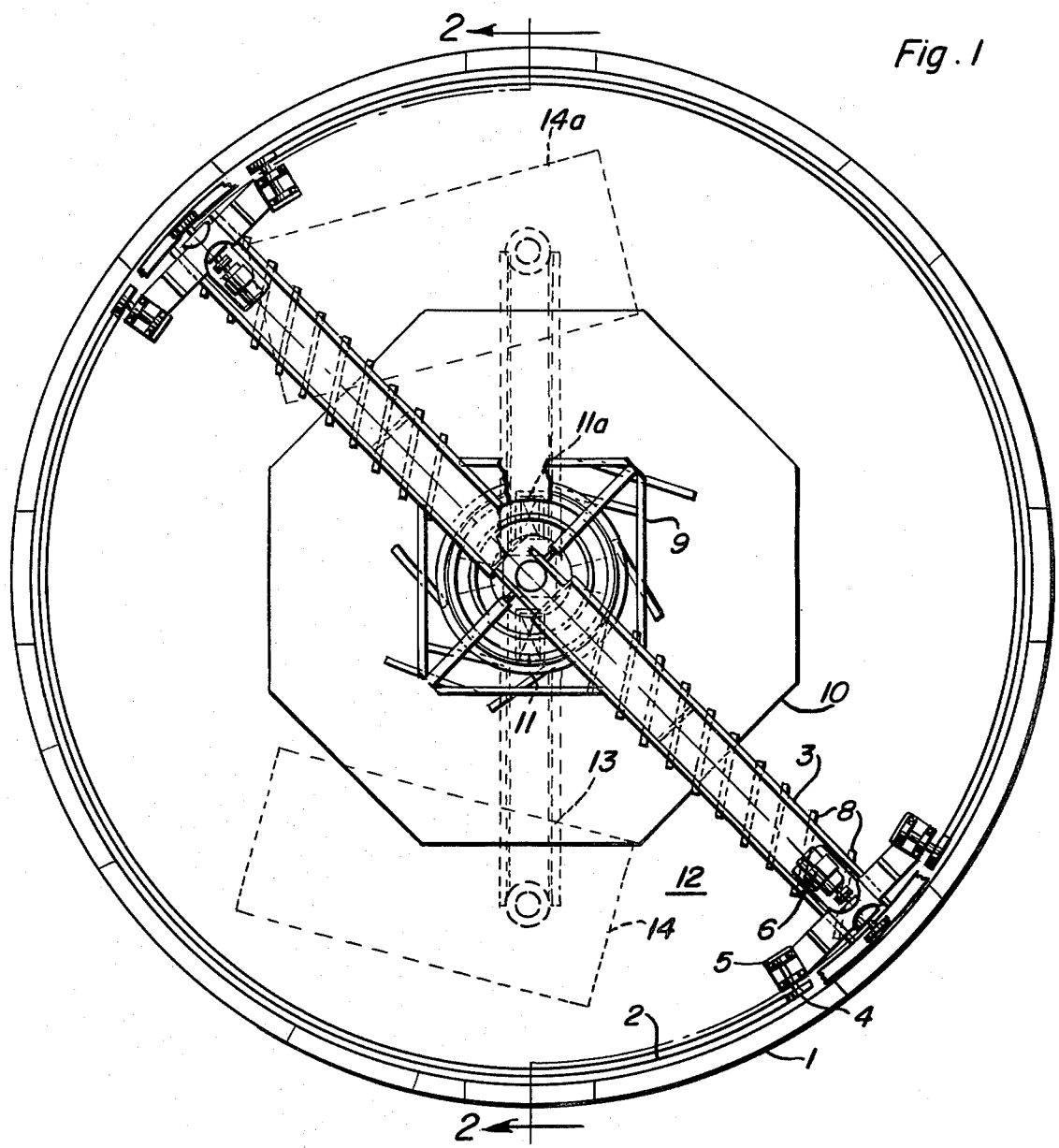
FIG. 1 shows a plan view of the apparatus of this invention.

Referring to FIG. 1, the outer shell of a circular prilling tower is shown at 1. Immediately within this shell, along the periphery, is a circumferential rail 2. Rail 2 is supported by stub beams 19 affixed to ring plate 25, which is affixed to the tower wall. Pinion ring 26 is affixed to the bottoms of stub beams 19 and runs directly underneath the rail 2 around the inner circumference of the tower 1. (See FIG. 2.) The prill rake is shown generally at 3. This rake is supported by peripheral wheels 4 on each side of each arm of the rake. The wheels 4 ride on rail 2 and are journaled in pillow blocks 5. Electric motor 6 underneath the rake drives the rake via gear reducer 20 through rake gear 7, meshing with pinion ring 26 (best seen in FIG. 2).

The rake 3 carries a plurality of rake beams 8, plus a square grate assembly shown generally at 9. Beneath the rake 3 is situated a stationary perforated screen 10, which carries one or more prill exit chutes 11. At 12 is shown the outer floor of the prill tower. This is solid (i.e., imperforate), and like the screen 10 is horizontal. Beneath the outer floor 12 and the screen 10 are shown by dotted lines the conveyor belt system 13 for collecting the prills and dropping them onto shaker screens 14.

Figure 2:
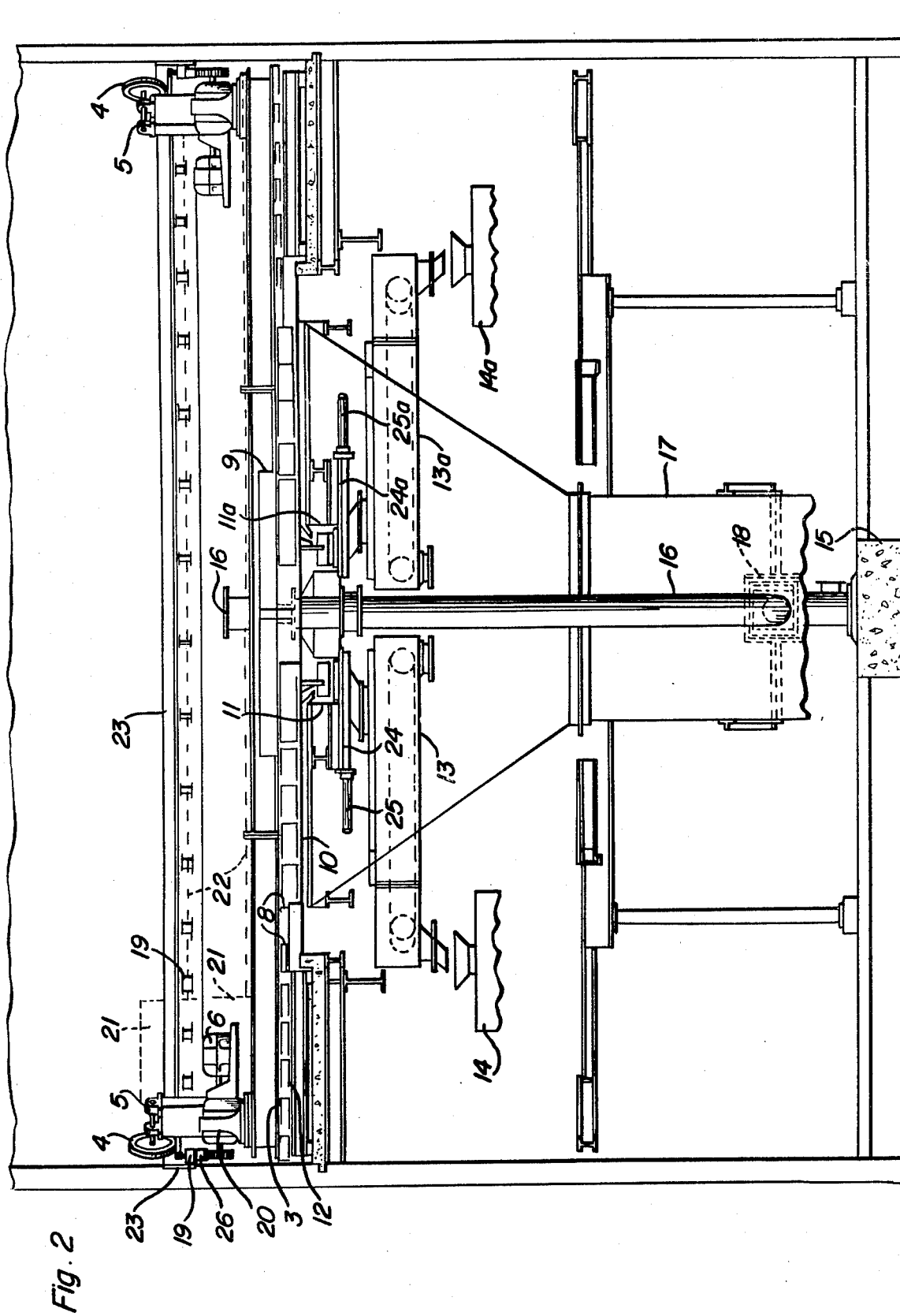
FIG. 2 is a sectional view of the apparatus of FIG. 1 taken along the line 2—2.

Referring now to FIG. 2, a foundation block is shown at 15. This carries pivot shaft 16 for the rake 3. This shaft 16 is hollow and does not turn. In addition to providing pivot support for the rake, it carries the electric lines running to the motors 6. Conical air plenum 17 carries an incoming air duct 18.

The gear and motor system is protected by a sheet metal cover shown in dotted lines at 21. Likewise the rake can optionally be protected by a sheet metal shroud 22 in the shape of an inverted V. Shroud 22 also covers the electric lines running to the motor from support shaft 16.

Either or both of the prill exit chutes 11 and 11a can be closed by slide gates 24 and 24a actuated respectively by air cylinders 25 and 25a.

MODE OF OPERATION

Molten urea at approximately 280° F. is sprayed from the top of the prill tower 1 from an arrangement of shower-head type devices (not shown) down through a stream of rising atmospheric air. This rising air is from two sources, through ports in the tower side above the rake, and from air duct 18. The portion of this air which was introduced in air duct 18 rises through fluidizing screen 10, and so on upward, where it mingles with the remaining air, and passes on up through the prilling tower. The liquid urea droplets are cooled through the solidification point to about 120° F. The newly formed urea prills accumulate on the flat bottom of the prill tower, said bottom comprising outer floor 12 plus screen 10, and are moved to the center of screen 10 by rake 3, which rotates around a pivot shaft 16. Electric motor 6 drives the rake via gear 7, which makes driving contact with pinion ring 26. Wheels 4 ride on rail 2 and carry the weight of the rake 3.

About one-third of the circular area of the base of the prill tower 1 consists of a fluid bed cooler (i.e., screen 10) through which atmospheric air is blown. The new prills are cooled to a nominal temperature of about 100° F. on the fluid bed. The grate 9 breaks up any oversized prill aggregations. At the center of the fluid bed discharge ducts 11 and 11a are provided such that the cooled prills move to these ducts and tumble down on to conveyor belts 13 and 13a, which carry the prills from the tower. The prills thus recovered can be treated on shaker screens 14 and 14a for selection of any desired screen size. When preparing very small prills (i.e., of an average size of 850 microns diameter) the air flow can be closed, and these small prills will cool without being fluidized. Feed grade prills are of this small type.

Although we have shown exit chutes 11 toward the center of the fluidized bed, actually one or more exit chutes can be placed anywhere within the fluidizing prill area, and the rake beams 8 correspondingly adjusted to carry prills to such exit(s).

In prior practice when a rake is used as the device for removing newly formed prills from a prill tower, it is usual to provide an external prill cooler. This cooler is generally a rotating drum through which atmospheric air is blown. Not only is this an additional piece of rotating equipment which requires operation and maintenance, but the cooler requires its own dust control system and affects the surface of the prills, which promotes the tendency to cake.

By coupling the prill tower fluid bed cooler with the rake it is possible to (1) eliminate the need for a large rotating drum cooler and (2) eliminate the need for the cooler's dust control system, since the dust produced by the fluid bed cooler is captured in the primary prill tower dust control system. A further improvement is provided in that the rake reduces the detrimental effect caused by localized blinding of the fluid bed which is caused by drops of molten urea. These factors combine to provide a more efficient and reliable prilling process.

We have tried a variation of this apparatus in which the fluidizing prills flowed over weirs at the perimeter of the fluidizing bed, without any action by a rake. However, to lead the prills falling in the tower into the central fluidizing area, it was necessary to drop down through a cone, apex down, thereby to concentrate the prill flow into the area of the perforated screen. When this is done, however, the hot prills tended to cake on the inner surfaces of the converging cone walls. It was necessary to shut the tower down from time to time to clean out the cone. We have no such trouble with the instant apparatus.

SOME PREFERRED EMBODIMENTS

The prill tower 1 is about 200 feet high by 50 feet inner diameter. It carries conventional dust scrubbers on its top. The capacity is 1200 short tons of urea/day.

At the spray head the urea temperature is 285° F. Prill size is 850–2100 microns diameter.

The rake 3 is 50 ft. long, and rotates at 1.5 rpm. The motors 6 and 6a are 25 horsepower each.

The square grate 9 is 11 feet square.

The screen 10 is wire mesh (built from several pieces), and the mesh is No. 20, U.S. Screen.

The depth of the fluidizing prill bed is about one inch. The rake beams 8 dip into the bed by about ½ inch.

Air is blown into plenum 17 at the rate of 175,000 CFM. This provides a flow through the fluidizing screen of about 300 CMF/sq. ft. The air feed is drawn from ambient air, e.g., at atmospheric pressure and at a temperature of 0° to 120° F. Additional air (about 325,000 CFM) is blown into the tower through ports in the side of the tower (not shown), above the rake 3.

The prills are cooled preferably to 100°–140° F.

PRIOR ART

U.S. Pat. No. 3,933,956 shows apparatus which provides for passage of air through a screen and around and through a falling mass of urea prills in a prill tower. There is no rake involved, and no fluidized action as such. According to this patent, a collecting rake is old in the art, as is a flat fluidized bed. However, the reference states that urea prills tend to build up on the collecting rake and that the fluidized bed tends to become unstable. There is no suggestion of combining a rake with a fluidized bed in a manner preventing prill build-up while likewise preventing instability in the bed.

What is claimed is:

1. The process of cooling and collecting urea prills that have fallen through a circular prilling tower without subsequently passing them through a separate cooler which comprises collecting said prills on a flat, substantially circular fluidized bed of prills about one inch thick fluidized by ambient air at about 0° to 120° F. whereby the prills are cooled to about 100° to 140° F.; rotating a multi-bladed rake through the bed to further mix the prills and to sweep them toward a collection exit; and collecting the thus cooled prills.

* * * * *